United States Patent
Keller et al.

(10) Patent No.: US 10,365,067 B2
(45) Date of Patent: Jul. 30, 2019

(54) SYSTEM FOR ALIGNING TARGET SENSOR AND WEAPON

(71) Applicant: RAYTHEON COMPANY, Waltham, MA (US)

(72) Inventors: Sean D. Keller, Tucson, AZ (US); Michael S. Cherry, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 337 days.

(21) Appl. No.: 15/292,068

(22) Filed: Oct. 12, 2016

(65) Prior Publication Data

US 2018/0216915 A1    Aug. 2, 2018

(51) Int. Cl.

| | |
|---|---|
| *F41G 3/06* | (2006.01) |
| *F41G 3/08* | (2006.01) |
| *F41G 3/16* | (2006.01) |
| *F41G 3/18* | (2006.01) |
| *G01S 17/02* | (2006.01) |
| *F41G 3/02* | (2006.01) |
| *F41G 3/04* | (2006.01) |
| *F41G 3/14* | (2006.01) |
| *F41G 3/32* | (2006.01) |
| *F41G 5/20* | (2006.01) |
| *F41G 5/26* | (2006.01) |
| *G01S 17/66* | (2006.01) |

(52) U.S. Cl.
CPC ............... *F41G 3/06* (2013.01); *F41G 3/02* (2013.01); *F41G 3/04* (2013.01); *F41G 3/08* (2013.01); *F41G 3/14* (2013.01); *F41G 3/16* (2013.01); *F41G 3/18* (2013.01); *F41G 3/323* (2013.01); *F41G 5/20* (2013.01); *F41G 5/26* (2013.01); *G01S 17/023* (2013.01); *G01S 17/66* (2013.01)

(58) Field of Classification Search
CPC ..... F41G 3/06; F41G 3/16; F41G 3/18; F41G 3/08; F41G 3/02; F41G 3/04; F41G 3/14; F41G 3/323; F41G 5/20; F41G 5/26; G01S 17/023; G01S 17/66
USPC ....................................................... 356/4.01
See application file for complete search history.

(56) References Cited

U.S. PATENT DOCUMENTS

| | | |
|---|---|---|
| 4,318,330 A | 3/1982 | Hausenblas |
| 9,151,572 B1 | 10/2015 | Sieracki |
| 10,054,439 B2 * | 8/2018 | Jensen ............ G01O 25/00 |

* cited by examiner

*Primary Examiner* — Daniel L Murphy
(74) *Attorney, Agent, or Firm* — Lewis Roca Rothgerber Christie LLP

(57) ABSTRACT

A system for aligning a weapon to a high-performance target sensor. A reference measurement sensor installed on the target sensor measures the direction and range to each of several references points on the weapon. From these measurements, and measurement by the target sensor of target states, a processing circuit calculates the states of the target in a coordinate system of the weapon. Each reference point may be a retroreflector; the reference measurement sensor may include an imaging sensor to measure direction, and a laser range finder to measure range.

20 Claims, 4 Drawing Sheets

SYSTEM FOR ALIGNING TARGET SENSOR AND WEAPON

BACKGROUND

1. Field

One or more aspects of embodiments according to the present invention relate to weapons systems, and more particularly to a system and method for aligning a weapons system.

2. Description of Related Art

Weapons mounted on moving platforms, such as naval vessels, may be aimed with the help of a high-performance target tracking system, which may sense the position of a target. A weapon control system may then aim the weapon at the target based on information received from the high-performance target tracking system. If the alignment of the high-performance target tracking system and the weapon change, e.g., as a result of ship flexure or the sway of a mast supporting the high-performance target tracking system, the targeting accuracy of the weapon may be compromised. It may be possible to reduce this source of error by mounting the high-performance target tracking system on or near the weapon, but such an approach may make it difficult for multiple weapons to share a single sensor, e.g., to share a single high-performance target tracking system.

Thus, there is a need for a system that can precisely measure the time-varying alignment of a target tracking system to a plurality of weapons.

SUMMARY

Aspects of embodiments of the present disclosure are directed toward a system for aligning a weapon to the high-performance target sensor. A second sensor package, the reference measurement sensor, installed in the high-performance target sensor measures the direction and range to each of several references points on the weapon. From these measurements, and a measurement by the high-performance target sensor of a target position, a processing circuit (e.g., a processing circuit executing an algorithm) calculates the position of the target in a coordinate system of the weapon. Each reference point may be a retroreflector; the reference measurement sensor may include an imaging sensor to measure direction, and a laser range finder to measure range.

According to an embodiment of the present invention there is provided a system for measuring the position of a target in a coordinate system of a weapon, the system including: a target sensor, configured to measure the position of the target, in a coordinate system of the target sensor; a plurality of retroreflectors secured to the weapon; a reference measurement sensor, including: an imaging sensor configured to measure the direction, in the coordinate system of the target sensor, to each retroreflector of a subset of the retroreflectors; and a ranging sensor configured to measure the distance, in the coordinate system of the target sensor, to each retroreflector of the subset of the retroreflectors; and a first processing circuit configured to calculate, from the direction and distance measurements, the position, in the coordinate system of the target sensor, of each of the subset of the retroreflectors; a second processing circuit configured to calculate, from: the position of the target, in the coordinate system of the target sensor; and the position, in the coordinate system of the target sensor, of each retroreflector of the subset of the retroreflectors, a target pointing direction of the weapon, in the coordinate system of the weapon, the target pointing direction being tangent, at the weapon, to a munition trajectory beginning at the weapon and terminating at the target.

In one embodiment, the second processing unit is further configured to calculate, from the position, in the coordinate system of the target sensor, of the target; and the position, in the coordinate system of the target sensor, of each of the subset of the retroreflectors, a position of the target in the coordinate system of the weapon.

In one embodiment, the weapon is in a turret, and the second processing unit is further configured to calculate, from the position of the target, in the coordinate system of the target sensor; the position, in the coordinate system of the target sensor, of each of the subset of the retroreflectors; and two measured turret actuator angles, two turret actuator angles corresponding to the target pointing direction of the weapon.

In one embodiment, the ranging sensor includes a laser range finder.

In one embodiment, the laser range finder is configured to emit a beam sufficiently wide to illuminate the entire weapon.

In one embodiment, a retroreflector of the plurality of retroreflectors includes an optical bandpass filter.

In one embodiment, a retroreflector of the plurality of retroreflectors includes an optical polarizing filter.

In one embodiment, the laser range finder has a range gate of less than 30 feet.

In one embodiment, the laser range finder is configured to emit a beam sufficiently narrow to illuminate only one retroreflector, of the plurality of retroreflectors, at a time.

In one embodiment, the system includes an electrically controlled steering mirror configured to direct the beam, under the control of a processing circuit, onto: a first retroreflector of the plurality of retroreflectors, a second retroreflector of the plurality of retroreflectors, or a third retroreflector of the plurality of retroreflectors.

In one embodiment, the imaging sensor has an instantaneous field of view less than the ratio of: a width of a retroreflector of the plurality of retroreflectors, and a distance between the reference measurement sensor and the retroreflector.

In one embodiment, the width of the retroreflector is greater than 1 inch and less than 3 inches; the distance between the reference measurement sensor and the retroreflector is more than 40 feet and less than 1200 feet; and the instantaneous field of view of the imaging sensor is less than 0.06 milliradians.

In one embodiment, the system includes the position of the target in the coordinate system of the target sensor, and the second processing circuit is configured to calculate, from: the state of the target; and the position, in the coordinate system of the target sensor, of each retroreflector of the subset of the retroreflectors, a target pointing direction of the weapon, in the coordinate system of the weapon, the target pointing direction being tangent, at the weapon, to a munition trajectory beginning at the weapon and terminating at the target.

In one embodiment, the first processing circuit, and the second processing circuit are the same processing circuit.

According to an embodiment of the present invention there is provided a system for measuring the position of a target in a coordinate system of a weapon, the system including: a target sensor, configured to measure the position of the target, in a coordinate system of the target sensor; a first plurality of retroreflectors secured to the weapon; a first reference measurement sensor, including: a second plurality of retroreflectors; an imaging sensor configured to measure the direction, in the coordinate system of the first reference measurement sensor, to each retroreflector of the first plurality of retroreflectors; and a ranging sensor configured to measure the distance, in the coordinate system of the first reference measurement sensor, to each retroreflector of the first plurality of retroreflectors; a second reference measurement sensor, including: an imaging sensor configured to measure the direction, in the coordinate system of the target sensor, to each retroreflector of the second plurality of retroreflectors; and a ranging sensor configured to measure the distance, in the coordinate system of the target sensor, to each retroreflector of the second plurality of retroreflectors; and a processing circuit configured to calculate, from: the direction and distance measurements; and the position of the target, in the coordinate system of the target sensor; a target pointing direction of the weapon, in the coordinate system of the weapon, the target pointing direction being tangent, at the weapon, to a munition trajectory beginning at the weapon and terminating at the target.

According to an embodiment of the present invention there is provided a method for aligning a target sensor and a weapon, the target sensor including a reference measurement sensor, the reference measurement sensor including an imaging sensor and a ranging sensor, the weapon including a plurality of retroreflectors, the method including: measuring, with the imaging sensor, the direction, in a coordinate system of the target sensor, to each retroreflector of a subset of the retroreflectors; measuring, with the ranging sensor, the distance, in the coordinate system of the target sensor, to each retroreflector of the subset of the retroreflectors; calculating, from the direction and distance measurements, the position, in the coordinate system of the target sensor, of each of the subset of the retroreflectors; and calculating, from: the position, in the coordinate system of the target sensor, of the target; and the position, in the coordinate system of the target sensor, of each of the subset of the retroreflectors, a target pointing direction of the weapon, in a coordinate system of the weapon, the target pointing direction being tangent, at the weapon, to a munition trajectory beginning at the weapon and terminating at the target.

In one embodiment, the method includes: calculating, from the position, in the coordinate system of the target sensor, of the target; and the position, in the coordinate system of the target sensor, of each of the subset of the retroreflectors, a position of the target in the coordinate system of the weapon.

In one embodiment, the method includes calculating, from the position of the target, in the coordinate system of the target sensor; the position, in the coordinate system of the target sensor, of each of the subset of the retroreflectors; and two measured turret actuator angles, two turret actuator angles corresponding to the target pointing direction of the weapon.

In one embodiment, the ranging sensor includes a laser range finder.

In one embodiment, the laser range finder is configured to emit a beam sufficiently wide to illuminate the entire weapon.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system for aligning a target sensor and a weapon provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
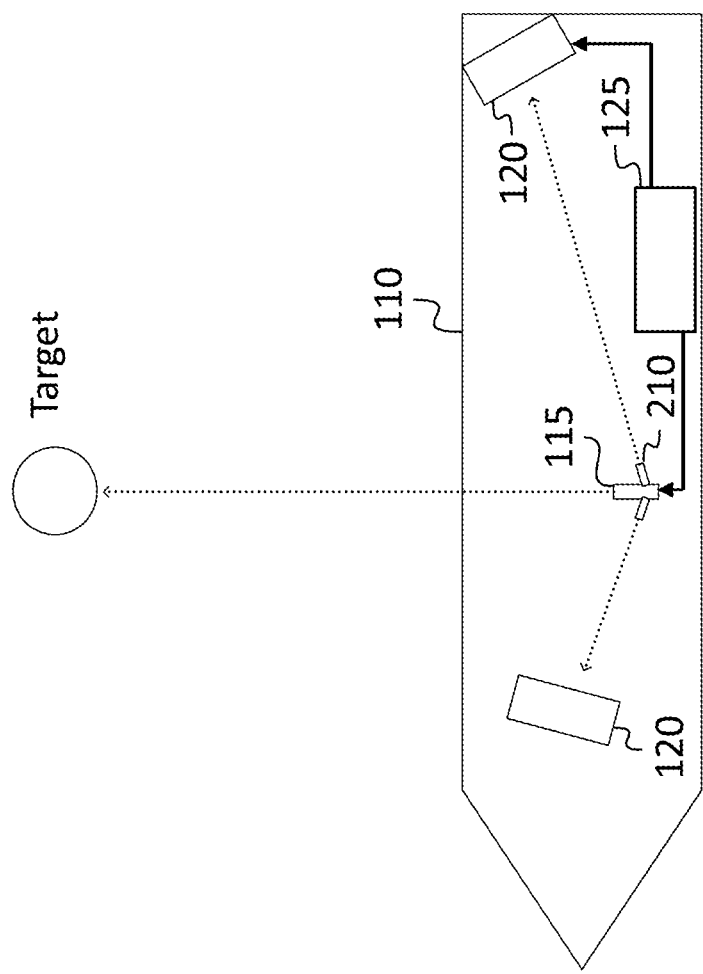
FIG. 1 is a schematic diagram of a ship and a target, according to an embodiment of the present invention.
Figure 2:
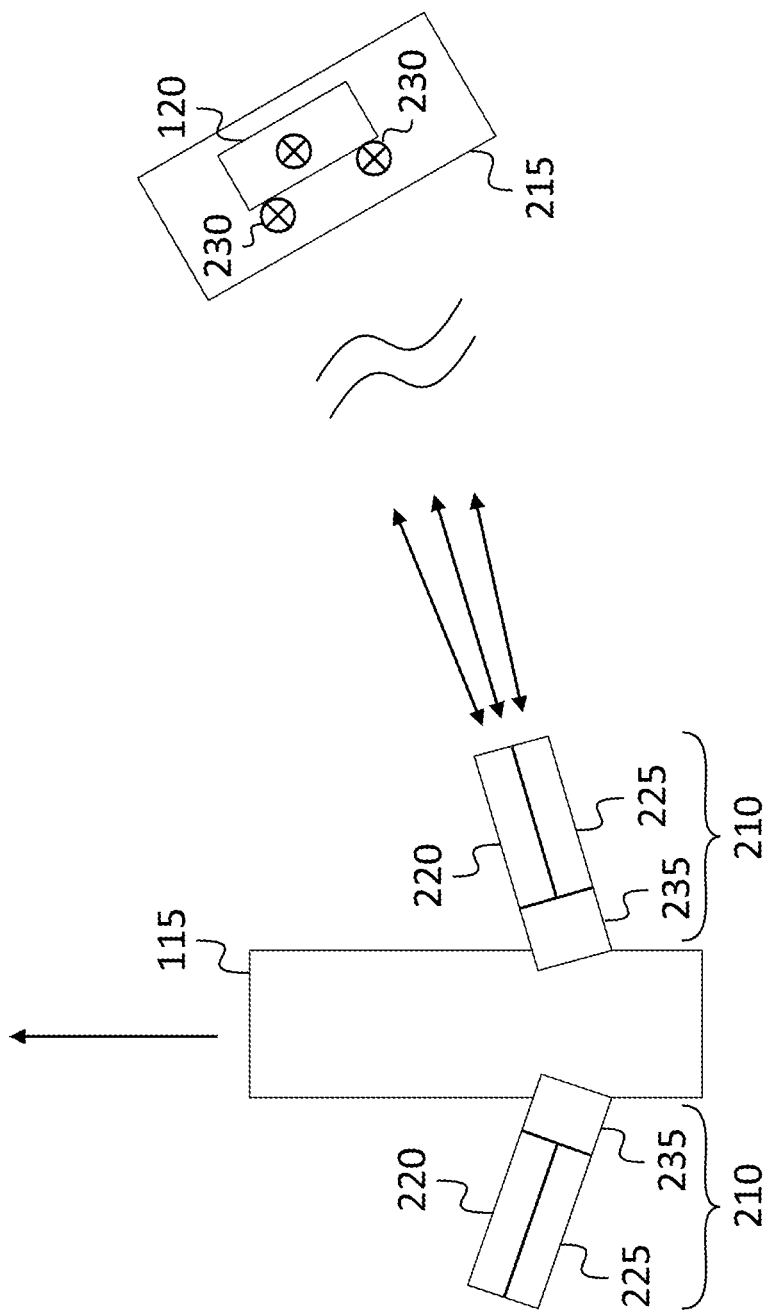
FIG. 2 is a schematic diagram of a high-performance target tracking system, a reference measurement sensor, and a plurality of retroreflectors on a weapon, according to an embodiment of the present invention.

Referring to FIG. 1, in one embodiment a ship 110 includes a high-performance target tracking system 115 and one or more weapons 120. Each of the weapons 120 may fire projectiles, or "munitions" that may be guided or unguided. Each weapon may be mounted in a 2-axis mount or "turret" 215 (FIG. 2). Such a turret 215 may have actuators (e.g., motors) to adjust, and encoders to measure, the pointing direction of the weapon, relative to the base of the turret 215, the base being secured to the ship (e.g., secured to a "weapon platform" on the deck of the ship). Before the ship sails, a surveying procedure may be performed in port, to measure or adjust the alignment of the high-performance target tracking system 115 and each of the weapons 120. The survey result may be expressed, for example, as the attitude and position of the base of the turret 215 in the coordinate system of the high-performance target tracking system 115, or as a transformation mapping the coordinates of any object in the coordinate system of the high-performance target tracking system 115 into the coordinates of the object in the coordinate system of the base of the turret 215.

The high-performance target tracking system 115 may include one or more sensors for detecting targets and measuring the location and relative velocity (Doppler) of each target in the coordinate system of the high-performance target tracking system 115. If it is a moving target the full set of target states needed for predicting future target states (e.g. at time of intercept) may also be calculated. The full set of target states may include, in addition to the position of the target, the velocity of the target, the acceleration of the target, the maneuver frequency of the target, the orientation of the target, the size of the target, and the temperature of the target. This calculation may be done by either the high-performance target tracking system or the weapon system. In operation, if a target is to be targeted, the target states in the coordinate system of the base of the turret 215 may be calculated using the appropriate transformation, and a pointing direction may be calculated in the weapon coordinate system (e.g., by adjusting the direction to the target to account for dropping of the munition due to gravity during flight and adjusting for predicted target motion). The munition may then be fired at the target.

If the ship flexes at sea, due for example to the effects of wind, waves, or temperature gradients, or if, for example, the high-performance target tracking system 115 is installed on a mast, and the mast flexes at sea, then the transformation of the target position in the coordinate system of the high-performance target tracking system 115 to the coordinate system of the weapon may change. Accordingly, in some embodiments, a system for measuring, in real time, the attitude, or attitude and position, of the weapon 120, in a coordinate system of the high-performance target tracking system 115, is employed to correct for changes in relative attitude and position due to, for example, flexing of the ship and of the mast. As used herein, the "position" of an object (such as the weapon) refers to translational location of the object, as defined, for example, by distances measured along three orthogonal axes of a coordinate system with respect to which the position of the object is defined. As used herein, the "attitude" of an object refers to the extent to which axes of the object (e.g., a set of three orthogonal axes of a coordinate system defined for the object) are rotated with respect to three orthogonal axis of a coordinate system with respect to which the attitude of the object is defined. The attitude may be represented, for example, by three Euler angles or by a quaternion. A weapon control system 125 may receive information from the high-performance target tracking system 115 and from a reference measurement sensor 210 in, or secured to, the high-performance target tracking system 115. This control system can then either provide desired aiming to the weapon 120 directly, or pass data to the weapon for the weapon to do its own control. The weapon control system 125 may include one or more processing circuits or algorithms (for data processing, discussed in further detail below).

In some embodiments, the target states are measured in the coordinate system of the high-performance target tracking system 115, the position and attitude of the weapon 120 are measured in the coordinate system of the high-performance target tracking system 115 (which may be the same as the coordinate system of the reference measurement sensor 210), and the measurements are combined to calculate the target states in the coordinate system of the weapon 120. From the target states in the coordinate system of the weapon, a direction (referred to herein as the "target pointing direction") to which the weapon may be set to hit the target (i.e., a pointing direction that is tangent to a munition trajectory that terminates at the target) may be calculated. From the target pointing direction, and the current turret actuator angles (e.g., an azimuth angle and an elevation angle, with respect to the deck of the ship, if the turret includes an actuator and an encoder for actuating and measuring the azimuth angle, and an actuator and an encoder for actuating and measuring the elevation angle), new turret actuator angles that correspond to the target pointing direction (i.e., turret actuator angles that when assumed by the turret 215 result in the weapon 120 pointing in the target pointing direction) may then be calculated. The target pointing direction may be calculated from the position of the target in the coordinate system of the weapon, or in the coordinate system of the base of the turret 215, or in an inertial coordinate system centered on the weapon in which one of the axes is parallel to gravity, or any other reference frame as necessary. Once calculated, the target pointing direction may be transformed into the coordinate system of the base of the turret 215 (if it is not already in that coordinate system) so that the turret angles that correspond to the target pointing direction may then be calculated.

Referring to FIG. 2, in some embodiments, one or more reference measurement sensors 210 are secured to the high-performance target tracking system 115, to measure the attitude of respective weapons 120 in real time. In some embodiments (e.g., those illustrated in FIGS. 1 and 2), the ship has a plurality of weapons 120, the high-performance target tracking system 115 has secured to it a plurality of reference measurement sensors 210, each aimed at a respective weapon 120 of the plurality of weapons 120. In such an embodiment, each of the plurality of weapons 120 is aligned to the high-performance target tracking system 115 by the respective reference measurement sensor 210, e.g., the measurements of the respective reference measurement sensor 210 may be used to transform the position of a target from the coordinate system of the high-performance target tracking system 115 to that of the respective weapon 120.

Each reference measurement sensor 210 may include a weapon system tracking camera 220 (which may be an imaging sensor) and one or more laser range finders 225, which may be used to measure the positions of retroreflectors 230 secured to the weapon, e.g., secured so that they are substantially immovable with respect to a portion the weapon system that directs the effector or provides a path for travel. Each retroreflector 230 may be a simple retroreflector, consisting, for example, of a single corner cube prism or a single cat's eye device, or it may be a compound retroreflector, including, for example, a plurality of corner cube prisms. For example, a compound retroreflector may be a piece of reflective tape having embedded in its surface a plurality of corner cube prisms. Each laser range finder 225 may emit a series of laser pulses and measure, for each pulse, the round trip time of flight (and the corresponding distance) from the laser range finder 225, to a retroreflector 230, and back to the laser range finder 225. Each weapon system tracking camera 220 may be employed to measure the direction to each retroreflector 230. From the distance and direction measurements, the position, in three-dimensional space, of each retroreflector 230 may be measured, relative to (i.e., in the coordinate system of) the reference measurement sensor 210. The reference measurement sensor 210 may include a reference measurement sensor processor 235 that receives data from each of the one or more laser range finders 225 and from the weapon system tracking camera 220, and calculates the attitude (or the attitude and position) of the weapon from the received data. In some embodiments the reference measurement sensor processor 235 may be a part of the weapon control system 125, or a single processing circuit may perform all of the data processing operations of the system. A source of illumination may be installed at or near the reference measurement sensor 210 to provide light that may reflect from the retroreflectors 230 into the weapon system tracking camera 220, to make the retroreflectors 230 brighter than their surroundings in images acquired by the weapon system tracking camera 220, and to allow operation in the dark. In some embodiments the light from the source of illumination may produce light within a range of wavelengths, e.g., wavelengths within a relatively narrow band, to facilitate the recognition of the retroreflectors 230 in the image. For example, if the source of illumination produces short wavelength infrared (SWIR) emissions and the camera is only sensitive in the SWIR band, the pixels that have a higher intensity than surrounding pixels will indicate the presence of a retroreflector 230 at a location corresponding to those pixels.

In some embodiments at least three retroreflectors are visible to the reference measurement sensor 210 at all times, regardless of the pointing direction of the weapon. To this end, in some embodiments more than three retroreflectors are installed on the weapon 120 so that, for example, if one of the retroreflectors 230 is hidden from the reference measurement sensor 210 for some pointing directions of the weapon 120, or turned so that it is not reflective (e.g., so that its reflective surface faces away from the reference measurement sensor 210), then the subset of the retroreflectors 230 that remains visible to the reference measurement sensor 210 includes at least three retroreflectors 230. The visible subset of the retroreflectors 230 need not be a proper subset of the retroreflectors 230, i.e., in some circumstances the visible subset of the retroreflectors 230 may include all of the retroreflectors 230.

In some embodiments it is sufficient for the reference measurement sensor 210 to measure the positions of only two retroreflectors 230 e.g., if the line joining the two retroreflectors 230 is parallel to the bore of the weapon. In this configuration, the reference measurement sensor 210 may not be capable of measuring all three of the angles defining the attitude of the weapon 120, but the angle not susceptible of measurement may be a roll angle (e.g., a roll angle about the bore of the weapon) about the portion the weapon system that directs the effector or provides a path for travel and this angle may be unnecessary for aiming the weapon. In such an embodiment, the two retroreflectors 230 may be identified by one of several possible methods of identification, discussed in further detail below.

Several configurations of one or more laser range finders 225 may be employed. In one embodiment, a single laser range finder, with a fixed beam sufficiently broad to illuminate (and measure the range to) all of the visible retroreflectors 230 is used. In such an embodiment, the laser range finder 225 may receive and detect, for each transmitted pulse, three respective return pulses from the three visible retroreflectors 230 and may calculate from the arrival times three corresponding ranges. The reference measurement sensor processor 235 may determine which of the several measured ranges corresponds to which retroreflector based on the respective sizes of the retroreflectors 230 in the camera images, e.g., by assuming that the larger the image of a given retroreflector 230 is in the camera image, the nearer it is to the reference measurement sensor 210.

In other embodiments, the laser range finder 225 may be able to distinguish the retroreflectors 230 based on wavelength or polarization. For example, each of the retroreflectors 230 may be covered by a respective optical band-pass filter, so that the retroreflectors 230 are only reflective at several different, non-overlapping wavelength bands. In such an embodiment the laser range finder 225 may emit light that is sufficiently broadband to include the center wavelengths of all of the band-pass filters, and the laser range finder 225 may include a plurality of sensors each sensitive only to a range of wavelengths corresponding to one of the band-pass filters, so that it will only detect laser pulses from the corresponding retroreflector 230. In another embodiment the sensors may be broadband and the laser may be narrow band, and be tuned to each of the center wavelengths in turn, e.g., the wavelength may be tuned for each transmitted pulse to select one of the retroreflectors 230.

In another embodiment, polarization may similarly be used to distinguish reflections from the retroreflectors 230. For example, the laser range finder 225 may emit circularly polarized pulses. Two of three different retro reflectors may be covered by polarizing filters (e.g., a vertical polarizing filter and a horizontal polarizing filter, so that three retroreflectors 230 may reflect vertically polarized light, horizontally polarized light, and circularly polarized light, respectively. The laser range finder 225 may include a first detector and a second detector, sensitive only to vertically polarized light and only to horizontally polarized light, respectively. A pulse reflected by the retroreflector that reflects vertically polarized light may then be detected only by the first detector, and a pulse reflected by the retroreflector that reflects horizontally polarized light may be detected only by the second detector. A pulse reflected by the retroreflector that reflects circularly polarized light (i.e., the retroreflector 230 lacking a polarizer) may be detected by both the first detector and the second detector. Accordingly, the reference measurement sensor processor 235 may be able to identify the retroreflector associated with each return pulse. In some embodiments, the laser range finder 225 may, instead of having multiple detectors each with a respective polarizing or bandpass filter, have a single detector behind a filter wheel, which may rotate to select any one of several filters in the wheel. In such an embodiment, at each position of the filter wheel, the laser range finder 225 may measure the distance to a subset (e.g., one) of the visible retroreflectors. The laser range finder 225 may operate, for example, at one or more near-infrared wavelengths (e.g., at 980 nm or 1064 nm) or at one or more short-wavelength infrared wavelengths (e.g., at 1550 nm).

In some embodiments the reference measurement sensor 210 includes a plurality of laser range finders 225, each with a beam sufficiently narrow to illuminate only one retroreflector 230 but large enough to account for minor motions of turret 215, or a steerable laser range finder 225 with a beam sufficiently narrow to illuminate only one retroreflector 230 at a time. In such an embodiment the beam may be sufficiently broad to overfill each of the retroreflectors 230 (i.e., it may have a beam width, at the weapon, that is greater than the width of any of the retroreflectors). A steerable laser range finder 225 may for example be mounted on a 2-axis mount and steered to point, in turn, to each of the directions in which the weapon system tracking camera 220 has identified retroreflectors 230. In other embodiments the light to (and returning from) the retroreflector 230 may be steered as a result of being reflected from a steerable mirror (e.g., a mirror on a 2-axis mount actuated by electrical actuators, e.g., piezoelectric actuators) installed near the laser range finder 225, or from two steerable mirrors, each steerable about one axis (e.g., each being mounted in a 1-axis mount such as a galvanometer, or "mirror galvanometer"). In some embodiments the reference measurement sensor 210 is capable of recognizing, and measuring the positions of, control points on the weapon 120 that are not retroreflectors 230 but recognizable features on the weapon, e.g., the end of the barrel, or the head of a particular bolt that, for example, secures an access cover on the weapon. In such an embodiment the presence of retroreflectors 230 on the weapon 120 may be unnecessary. In this embodiment, the size of the control points may be calculated based on the image of the weapon and used to determine the position and attitude of the weapon.

The high-performance target tracking system 115 may include, for example, a radar system, and/or a forward-looking infrared (FLIR) sensor, and the high-performance target tracking system 115 may be capable of measuring the location, in three dimensions, and closing velocity of a target, in a coordinate system defined for the high-performance target tracking system 115. The weapon control system 125 may receive (i) a position of the target (in the coordinate system defined for the high-performance target tracking system 115) from the high-performance target tracking system 115, and (ii) information, from the reference measurement sensor processor 235 regarding the attitude of the weapon 120 in the coordinate system defined for the high-performance target tracking system 115. The weapon control system 125 may then, from this information, calculate the position of the target in a coordinate system defined for the weapon, and it may calculate a pointing direction for the weapon, for intercepting the target.

In some embodiments the retroreflectors 230 are chosen to be sufficiently large to occupy more than one pixel on the sensor of the weapon system tracking camera 220. The retroreflectors 230 may also be chosen to be sufficiently small, e.g., occupying as few pixels as feasible on the sensor of the weapon system tracking camera 220, to prevent damage, for example during maintenance. The sensitivity of the weapon measurement may be impacted by the size of the retroreflector.

In some embodiments, the frequency content of changes in the relative alignment of the high-performance target tracking system 115 and the weapon 120, may have a power spectrum influenced by the spectra of sources (e.g., wind and waves) and by mechanical modes of the system (e.g., modes of the ship and mast). The resulting power spectrum of the alignment changes may be dominated by frequencies well below 7 Hz, so that an update rate of 14 Hz may be sufficient to correct for most of the weapon targeting error that would otherwise result from the changes in alignment. In some embodiments, significantly higher update rates, e.g., 30 Hz or 60 Hz may be used (and, e.g., the latency of measurements of the relative alignment of the high-performance target tracking system 115 and the weapon 120 may be less than 30 ms), potentially resulting in significant performance margin.

Figure 3:
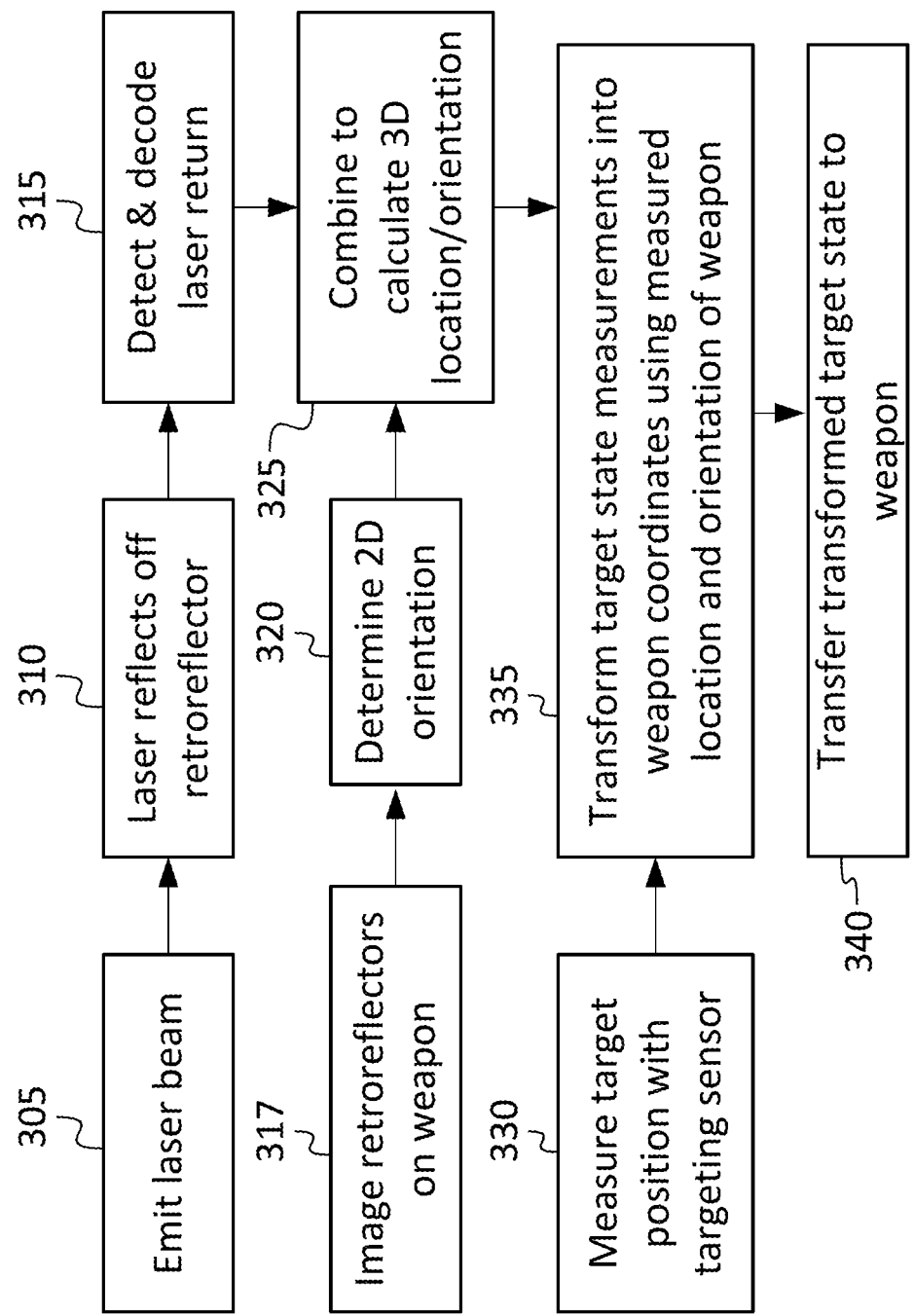
FIG. 3 is a flow chart of a method for determining the position of a target in a coordinate system of a weapon, according to an embodiment of the present invention.

Referring to FIG. 3, in one embodiment a method of determining the position of a target in the coordinate system of a weapon includes, in an act 305, emitting a laser beam from a laser range finder 225, and reflecting, in an act 310, by a retroreflector, the laser beam. The method further includes, in an act 315, detecting the laser return, and decoding (i.e., estimating the time of flight of) the laser return, imaging, in an act 317, a plurality of retroreflectors secured to the weapon, determining, in an act 320, a 2-dimensional (2D) orientation of the weapon, combining, in an act 325, the 2D orientation with one or more time of flight estimates, to form a 3-dimensional (3D) measurement of the location and orientation of the weapon, measuring, in an act 330, the position of a target using a high-performance target tracking system (or "targeting sensor") 115, and transforming, in an act 335, the target location and orientation measurements (or "state measurements") into the position of the target in the coordinate system of a weapon (or "weapon coordinates"), using the measured location and orientation of the weapon. In an act 340 the transformed target state information may then be transferred to the weapon. In some embodiments, misalignments due to ship flexure and mast flex (or sway) may be measured using retroreflectors secured to the weapon platform, instead of or in addition to retroreflectors secured to the weapon.

In some embodiments, the performance of a system for correcting for alignment variation may be estimated according to Table 1.

TABLE 1

| Parameter | Value | Units |
|---|---|---|
| Ship Flexure | 2 | arc min |
| Mast Sway | 12 | inch |
| Distance | 800 | feet |
| Relative Motion | 17.59 | inch |
| | 0.001831774 | rad |
| Min weapon marker separation | 3 | feet |
| Weapon size | 10 | feet |
| | 0.012500651 | rad |
| | 12.50065108 | mrad |
| Weapon marker size | 2 | in |
| | 0.208 | mrad |
| Pixel Size | 15 | um |
| Pixels (V) | 480 | px |
| | 7.2 | mm |
| Pixels (H) | 640 | px |
| | 9.6 | mm |
| EFL | 500 | mm |
| IFOV | 0.03 | mrad |
| FOV (V) | 0.0144 | rad |
| | 0.8250 | deg |
| FOV (H) | 0.0192 | rad |
| | 1.0999 | deg |
| Weapon Subtense | 417 | px |
| Weapon Fill Factor | 86.81 | % |
| Marker Subtense | 6.9444 | px |
| Range gate | 5 | m |
| | 15.24 | ft |
| Gate utilization | 75.2 | % |
| Range min | 792.38 | ft |
| Range max | 807.62 | ft |
| Range accuracy | 0.0028 | in |
| In-plane rotation accuracy | 30.0 | urad |
| Out-of-plane rotation accuracy | 155.0 | urad |

In the analysis of Table 1, ship flexure is taken to produce 2 arc minutes of alignment change. This, together with mast sway of 12 inches, and a distance of 800 feet between the high-performance target tracking system 115 and the weapon, results in total relative motion of 17.6 inches, corresponding to 0.0018 radians. A weapon having a size of 10 feet subtends an angle of 12.5 milliradians (mrad) at the high-performance target tracking system 115, and each retroreflector (or "weapon marker") 230 subtends an angle of 0.21 mrad if it has a size of 2 inches. A weapon system tracking camera 220 with a 7.2 mm×9.2 mm (480 pixel×640 pixel) sensor array and a lens with an effective focal length of 500 mm has an instantaneous field of view of 0.03 mrad, and a total field of view of 14.4 mrad×19.2 mrad.

The laser range finder 225 is taken, in the analysis of Table 1, to operate with a range gate of 5 m (15.2 feet), resulting in a gate utilization (the ratio of (i) the sum of the relative motion (17.6 inches) and the length of the weapon (10 feet) and (ii) the range gate of 15.24 feet) of 75.2% (e.g., (17.6 inches+10 feet)/(15.24 feet)=0.752). The range gate of 15.2 feet results in a minimum range of 792.4 feet and a maximum range of 807.6 feet, when adjusted to be centered at 800 feet. The range accuracy in this embodiment, assuming 16 bit resolution within the range gate, is 15.2 feet/65536, or 0.0028 inches, corresponding to out-of-plane accuracy of 155 micro radians (calculated as 2×0.0028 inches/3 feet). The in-plane rotation accuracy, assuming that the positions of the retroreflectors 230 are measured to an accuracy of one pixel in the weapon system tracking camera 220, is 30 micro radians (i.e., the instantaneous field of view).

Figure 4:
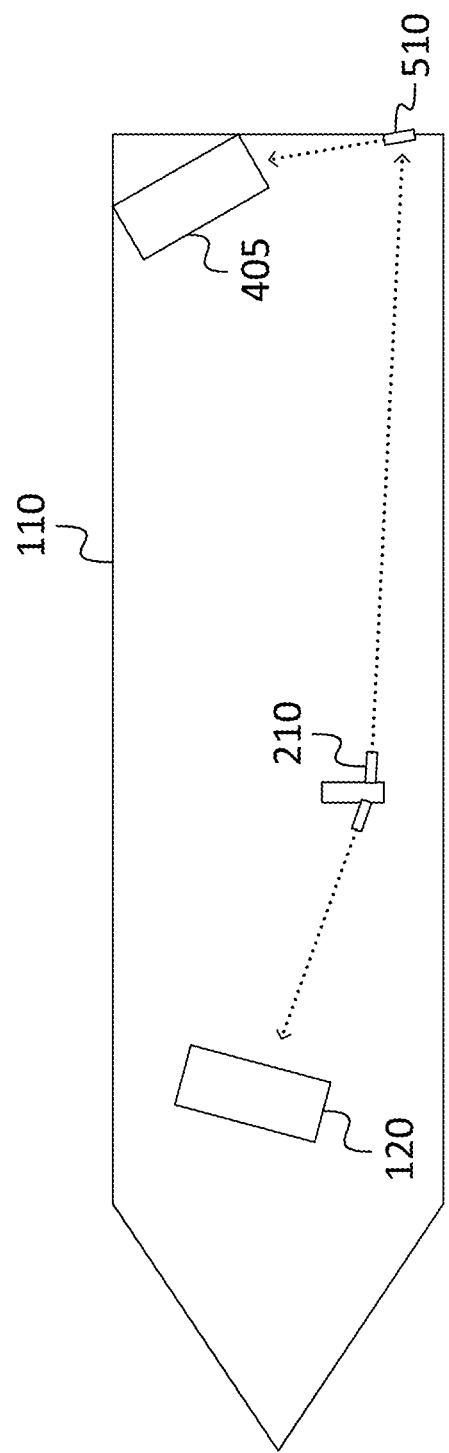
FIG. 4 is a schematic diagram of a system for aligning two weapons, according to an embodiment of the present invention.

Referring to FIG. 4, in some embodiments an obstruction may prevent a weapon 405 from being visible from the high-performance target tracking system 115, and a second reference measurement sensor 510 is installed at a position on the ship from which both the high-performance target tracking system 115 and the weapon 120 are visible. The second reference measurement sensor 510 measures the position and attitude of the weapon 405 in the coordinate system of the second reference measurement sensor 510, and the first reference measurement sensor 210 measures the position and attitude of the second reference measurement sensor 510 in the coordinate system of the reference measurement sensor 210 (and of the high-performance target tracking system 115). From these measurements, the position and attitude of the weapon 405 may be calculated in the coordinate system of the reference measurement sensor 210 (and of the high-performance target tracking system 115). In a related embodiment, the high-performance target tracking system 115 and reference measurement sensor 210 may be on an unmanned aerial vehicle (UAV), and the second reference measurement sensor 510 may be mounted on the ship, with line of sight visibility of both the unmanned aerial vehicle and the weapon 120. In this embodiment, the UAV may provide high-performance target tracking to the ship in the coordinate system of the weapon.

In some embodiments at least one of the reference measurement sensor processor 235, and the weapon control system 125 is, or includes, a processing circuit. The term "processing circuit" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

Although limited embodiments of a system for aligning a target sensor and a weapon have been specifically described and illustrated herein, many modifications and variations will be apparent to those skilled in the art. Accordingly, it is to be understood that a system for aligning a target sensor and a weapon employed according to principles of this invention may be embodied other than as specifically described herein. The invention is also defined in the following claims, and equivalents thereof.

What is claimed is:

1. A system for measuring the position of a target in a coordinate system of a weapon, the system comprising:
 a target sensor, configured to measure the position of the target, in a coordinate system of the target sensor;
 a plurality of retroreflectors secured to the weapon;
 a reference measurement sensor, comprising:
  an imaging sensor configured to measure the direction, in the coordinate system of the target sensor, to each retroreflector of a subset of the retroreflectors; and
  a ranging sensor configured to measure the distance, in the coordinate system of the target sensor, to each retroreflector of the subset of the retroreflectors; and
 a first processing circuit configured to calculate, from the direction and distance measurements, the position, in the coordinate system of the target sensor, of each of the subset of the retroreflectors;
 a second processing circuit configured to calculate, from:
  the position of the target, in the coordinate system of the target sensor; and
  the position, in the coordinate system of the target sensor, of each retroreflector of the subset of the retroreflectors,
 a target pointing direction of the weapon, in the coordinate system of the weapon, the target pointing direction being tangent, at the weapon, to a munition trajectory beginning at the weapon and terminating at the target.

2. The system of claim 1, wherein the second processing unit is further configured to calculate, from
 the position, in the coordinate system of the target sensor, of the target; and
 the position, in the coordinate system of the target sensor, of each of the subset of the retroreflectors,
 a position of the target in the coordinate system of the weapon.

3. The system of claim 1, wherein the weapon is in a turret, and the second processing unit is further configured to calculate, from
 the position of the target, in the coordinate system of the target sensor;
 the position, in the coordinate system of the target sensor, of each of the subset of the retroreflectors; and
 two measured turret actuator angles,
 two turret actuator angles corresponding to the target pointing direction of the weapon.

4. The system of claim 1, wherein the ranging sensor comprises a laser range finder.

5. The system of claim 4, wherein the laser range finder is configured to emit a beam sufficiently wide to illuminate the entire weapon.

6. The system of claim 5, wherein a retroreflector of the plurality of retroreflectors comprises an optical bandpass filter.

7. The system of claim 5, wherein a retroreflector of the plurality of retroreflectors comprises an optical polarizing filter.

8. The system of claim 4, wherein the laser range finder has a range gate of less than 30 feet.

9. The system of claim 4, wherein the laser range finder is configured to emit a beam sufficiently narrow to illuminate only one retroreflector, of the plurality of retroreflectors, at a time.

10. The system of claim 9, further comprising an electrically controlled steering mirror configured to direct the beam, under the control of a processing circuit, onto:
 a first retroreflector of the plurality of retroreflectors,
 a second retroreflector of the plurality of retroreflectors, or
 a third retroreflector of the plurality of retroreflectors.

11. The system of claim 1, wherein the imaging sensor has an instantaneous field of view less than the ratio of:
 a width of a retroreflector of the plurality of retroreflectors, and
 a distance between the reference measurement sensor and the retroreflector.

12. The system of claim 11, wherein:
 the width of the retroreflector is greater than 1 inch and less than 3 inches;
 the distance between the reference measurement sensor and the retroreflector is more than 40 feet and less than 1200 feet; and the instantaneous field of view of the imaging sensor is less than 0.06 milliradians.

13. The system of claim 1, wherein:
the target sensor is configured to measure a state of the target, the state of the target including the position of the target in the coordinate system of the target sensor, and
the second processing circuit is configured to calculate, from:
  the state of the target; and
  the position, in the coordinate system of the target sensor, of each retroreflector of the subset of the retroreflectors,
a target pointing direction of the weapon, in the coordinate system of the weapon, the target pointing direction being tangent, at the weapon, to a munition trajectory beginning at the weapon and terminating at the target.

14. The system of claim 1, wherein:
the first processing circuit, and
the second processing circuit
are the same processing circuit.

15. A system for measuring the position of a target in a coordinate system of a weapon, the system comprising:
a target sensor, configured to measure the position of the target, in a coordinate system of the target sensor;
a first plurality of retroreflectors secured to the weapon;
a first reference measurement sensor, comprising:
  a second plurality of retroreflectors;
  an imaging sensor configured to measure the direction, in the coordinate system of the first reference measurement sensor, to each retroreflector of the first plurality of retroreflectors; and
  a ranging sensor configured to measure the distance, in the coordinate system of the first reference measurement sensor, to each retroreflector of the first plurality of retroreflectors;
a second reference measurement sensor, comprising:
  an imaging sensor configured to measure the direction, in the coordinate system of the target sensor, to each retroreflector of the second plurality of retroreflectors; and
  a ranging sensor configured to measure the distance, in the coordinate system of the target sensor, to each retroreflector of the second plurality of retroreflectors; and
a processing circuit configured to calculate, from:
  the direction and distance measurements; and
  the position of the target, in the coordinate system of the target sensor;
a target pointing direction of the weapon, in the coordinate system of the weapon, the target pointing direction being tangent, at the weapon, to a munition trajectory beginning at the weapon and terminating at the target.

16. A method for aligning a target sensor and a weapon, the target sensor comprising a reference measurement sensor, the reference measurement sensor comprising an imaging sensor and a ranging sensor, the weapon comprising a plurality of retroreflectors, the method comprising:
measuring, with the imaging sensor, the direction, in a coordinate system of the target sensor, to each retroreflector of a subset of the retroreflectors;
measuring, with the ranging sensor, the distance, in the coordinate system of the target sensor, to each retroreflector of the subset of the retroreflectors;
calculating, from the direction and distance measurements, the position, in the coordinate system of the target sensor, of each of the subset of the retroreflectors; and
calculating,
from:
  the position, in the coordinate system of the target sensor, of the target; and
  the position, in the coordinate system of the target sensor, of each of the subset of the retroreflectors,
a target pointing direction of the weapon, in a coordinate system of the weapon, the target pointing direction being tangent, at the weapon, to a munition trajectory beginning at the weapon and terminating at the target.

17. The method of claim 16, further comprising:
calculating, from
  the position, in the coordinate system of the target sensor, of the target; and
  the position, in the coordinate system of the target sensor, of each of the subset of the retroreflectors,
a position of the target in the coordinate system of the weapon.

18. The method of claim 16 further comprising calculating, from
the position of the target, in the coordinate system of the target sensor;
the position, in the coordinate system of the target sensor, of each of the subset of the retroreflectors; and
two measured turret actuator angles,
two turret actuator angles corresponding to the target pointing direction of the weapon.

19. The method of claim 16, wherein the ranging sensor comprises a laser range finder.

20. The method of claim 19, wherein the laser range finder is configured to emit a beam sufficiently wide to illuminate the entire weapon.

* * * * *